Figure 5:
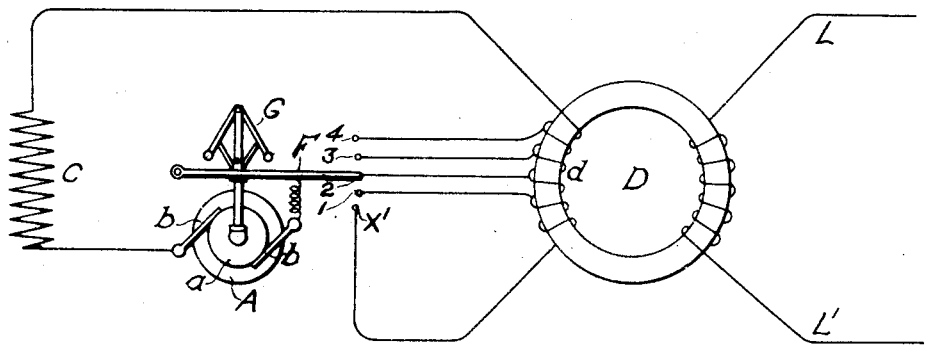

No. 791,440. PATENTED MAY 30, 1905.
A. CHURCHWARD.
METHOD OF OPERATING ALTERNATING CURRENT MOTORS.
APPLICATION FILED OCT. 31, 1903.
2 SHEETS—SHEET 1.
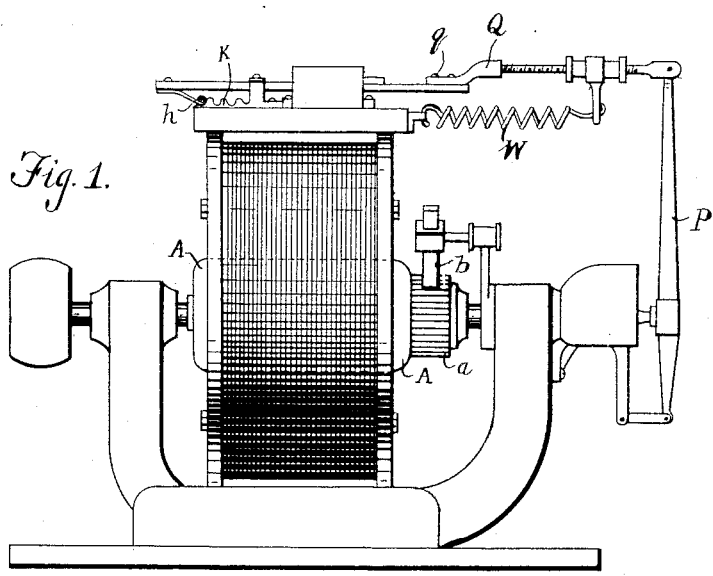
Fig. 1.
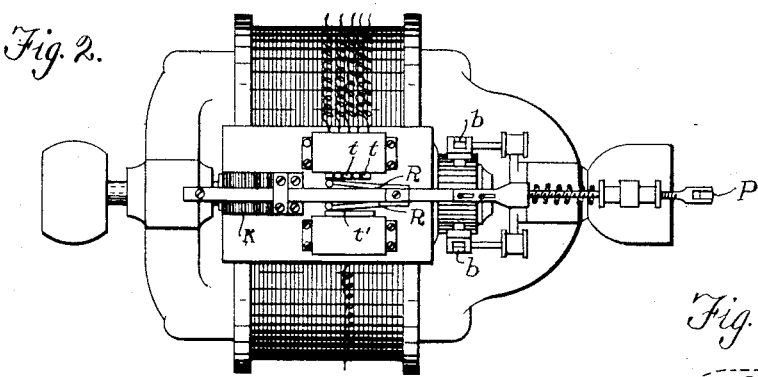
Fig. 2.
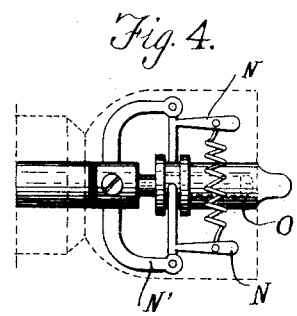
Fig. 4.
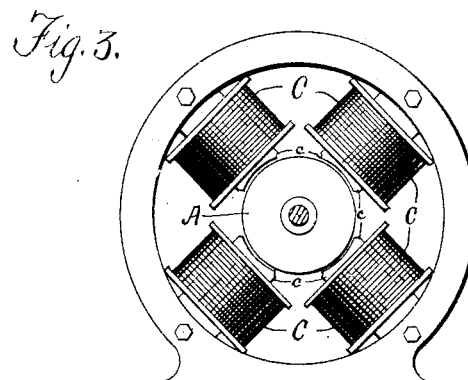
Fig. 3.
Witnesses:
Inventor,
Alexander Churchward
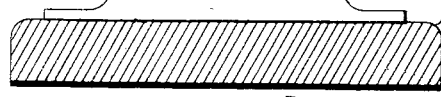
By
Atty.

No. 791,440. PATENTED MAY 30, 1905.
A. CHURCHWARD.
METHOD OF OPERATING ALTERNATING CURRENT MOTORS.
APPLICATION FILED OCT. 31, 1903.

2 SHEETS—SHEET 2.

Witnesses:
Marcus L. Byng.
Helen Oxford

Inventor.
Alexander Churchward
by Albert H. Adams
Att'y.

No. 791,440.	Patented May 30, 1905.

UNITED STATES PATENT OFFICE.

ALEXANDER CHURCHWARD, OF NEW YORK, N. Y.

METHOD OF OPERATING ALTERNATING-CURRENT MOTORS.

SPECIFICATION forming part of Letters Patent No. 791,440, dated May 30, 1905.

Original application filed February 20, 1897, Serial No. 629,849. Divided and this application filed October 31, 1903. Serial No. 179,298.

*To all whom it may concern:*

Be it known that I, ALEXANDER CHURCHWARD, a citizen of the United States, residing at New York, county of New York, State of New York, have invented certain new and useful Improvements in Methods of Operating Alternating-Current Motors, of which the following is a specification.

This application is a division of an application filed by me February 20, 1897, Serial No. 629,849.

My invention relates to single-phase alternating-current motors of the type in which the winding and general organization is that of any ordinary continuous or direct current motor or dynamo. As is well known, this class of machines will start and develop power when fed with alternating currents to both field and armature and will accelerate and finally reach a speed which is synchronous with the alternations; but the machine is not self-regulating and will run away under light load. Such machines, moreover, run as alternating-current motors are ordinarily very inefficient, among other things, because of the losses arising from self-induction of their parts under the action of the alternating currents, a source of loss, however, which may be largely avoided if the machine may be kept running at a speed synchronous with the rate of alternations, provided that it is so constructed as to have primarily a low self-induction. The losses from self-induction are also largely augmented, owing to the fact that such motors in order that they may have a large starting torque have been hitherto so constructed that of necessity they have also high self-induction, which remains as a source of loss even after the motor is brought up to whatever working speed is chosen for it.

The general object of my invention is to permit machines of this class to be operated with high efficiency by alternating currents passed to the direct-current armature-winding through the direct-current commutator, and in carrying out my invention I employ means for keeping the armature at synchronous or similar predetermined speed while so operated, the said means being arranged to produce an extra voltage to overcome the high self-induction of the motor at starting.

The invention is particularly useful in connection with series-wound motors having a continuous-current armature-winding and commutator. When a motor of this kind is run in synchronism with the generator, the armature or revolving part becomes in reality a constant field excited by a direct current—that is, by the alternating current rectified by the continuous-current commutator, to which the armature-coils are connected and to which the alternating currents are fed. This will be readily appreciated when it is considered that the current generated by the direct-current armature is primarily an alternating current which is rectified by means of the commutator. Conversely, if an alternating current is supplied to said armature through the medium of its commutator the result will be, if the armature is in step with the alternations, that the current as it flows in the armature will be a direct current and the armature will exhibit a field with constant poles. The poles of the field-magnet will, however, alternate and will act magnetically as a revolving field to rotate the armature. Operated under this condition there is no loss by hysteresis in the rotor, because there are no reversals of magnetism taking place, and the current being continuous there is no self-induction in the wires; but to preserve this condition some regulating means must be provided for holding the motor in or about synchronism. This may be secured by various means—as, for instance, by any suitable regulating device adapted to regulate the alternating current fed to the machine, so as to diminish the current when the speed rises above the synchronous or predetermined speed and to increase it when the speed falls below such speed. One way in which this may be accomplished is by varying the impressed electromotive force, as by cutting in and out the coils of a transformer or in other ways regulating the voltage. The regulation may be controlled either by hand or automatically by a suitable centrifugal governor or other device responsive to changes of speed. It has been shown that if the motor runs in synchronism there will be no more loss due to eddy-currents, hysteresis, or self-induction in the rotor than in the field of a direct-current motor. If we desire to run the motor at a slower speed, the loss in the rotor will be increased. If, however, we run it at half speed, the losses will only be due to half the number of reversals of the line. For example:

Synchronous speed 1,800 R. P. M. 4 poles = 7,200 alt.
Half speed 900 R. P. M. 4 poles = 3,600 alt.

So, also, of any other speed which is a submultiple of the synchronous speed, so that by running at such predetermined speeds we can vary the speed within a large range without much loss in efficiency.

In the present application I shall claim the method of regulating the operation of motors of the above type by varying the impressed electromotive force. In an application filed by me March 29, 1897, Serial No. 629,852, I have illustrated, described, and claimed one arrangement of apparatus by which this method can be carried out.

In the accompanying drawings, Figure 1 is an end elevation of a motor and automatic attachment suitable for carrying out my invention. Fig. 2 is a plan view. Fig. 3 is a side elevation of the field-magnet of the motor. Fig. 4 is a detail of a form of centrifugal governor, and Figs. 5 and 6 are diagrams showing the circuits of the apparatus.

In the drawings I have shown the invention as carried out in connection with a four-pole machine, the armature A of which is wound like any direct or continuous current generator or motor and is provided with the usual commutator, the cylinder of which is indicated at $a$ and the brushes at $b$, disposed about said cylinder in the usual manner. The four field-magnet poles are shown at $c$ and the field-magnet coils at C. By suitable connections the field-coils are in series with the armature, as indicated in the diagram, or are otherwise connected to the supply-circuits, so that alternating circuits will flow to said coils in step with or at the same frequency with the alternating currents fed to the commutator-brushes and through the commutator-cylinder to the armature. By preference I organize and operate the motor as a series motor—that is, with the armature and field coils in series with one another, and this is the condition of the machine both during starting or acceleration and when running at normal speed. The machine is fed with alternating currents from any desired source—as, for instance, from the secondary of a transformer or converter D, as indicated in the diagrams, the primary of which is supplied from mains or supply-wires L L'.

Figure 6:
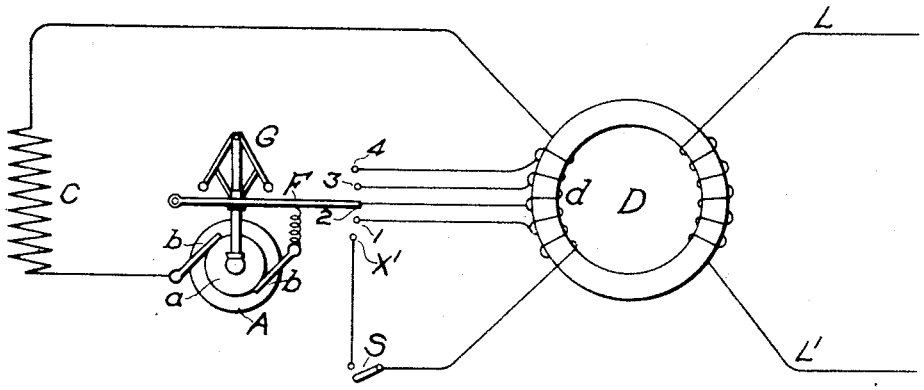

In Figs. 5 and 6 are shown means for regulating the speed of the motor, which consist of a sectional secondary $d$ for the transformer and a suitable switch F, moving over a set of contacts (numbered 1 2 3 4) to which the sections of coil $d$ are connected, as shown. The secondary feeds alternating currents through the switch, the armature, and the field C in series, and the switch by its movement increases or diminishes the number of coils $d$ in action. When the speed falls from the desired synchronous or other predetermined speed, the switch is turned to increase the number of coils $d$ in action, and thus increase the impressed electromotive force, and when the speed rises above the predetermined or synchronous speed the switch is turned in the opposite direction to decrease the number of coils $d$ and lower the impressed electromotive force. When the machine is running at less than the full synchronous speed or in the starting operation, the alternating current flows as an alternating current in both armature and field in series with one another; but when the synchronous speed is reached the current flows as a continuous or direct current in said armature and as an alternating current in the field; but said field and armature are in series as before. By suitable adjustment of the switches the armature may be kept at the synchronous speed. If desired, the machine may be kept at a lower than synchronous speed in the same manner—as, for instance, at half speed or quarter speed—by proper adjustment of the regulating devices and will then work at high efficiency.

The switch or other regulator may be operated by hand or automatically by any device responsive to differences of speed—as, for instance, by a centrifugal governor, (typified at G, Figs. 5 and 6,) that may be connected with the switch or other device in any suitable way. A suitable construction of governor and switch is shown in Figs. 1, 2, and 4 and will be presently described.

The operation of the devices so far as described would be as follows: At starting or at low speed the switch would be on contact 1. The motor would then be supplied with all the voltage due to all the coils $d$ between contact 1 and the opposite end of coils $d$, connected to the field C. The high self-induction of the motor at starting would be compensated for by the large voltage thus supplied. As the motor increases in speed the switch would be turned, decreasing the voltage of the applied current until the synchronous speed is reached, at which time the switch rests on a contact such that the voltage would keep the motor running at that speed. On further increase of speed the switch would further decrease the voltage and the motor will drop back to the synchronous or other predetermined speed. When the motor is at rest and current is turned on, there are eddy-current losses, self-induction, and losses due to hysteresis, which all tend to reduce the useful voltage of the line by increasing the self-induction of the motor, so that if the motor has to have a large starting torque the self-induction will be too great to pass sufficient current to give the necessary torque. To allow an excess of current to flow when starting the motor, I provide some auxiliary means in connection therewith for permitting or furnishing such excess current, and thereby avoid the necessity hitherto existing of using a motor which in order to get the desired starting torque has been made unnecessarily large or has been so constructed that when running at speed it will be inefficient. Such auxiliary means may be extra turns in the converter, so that if the machine is wound to run on, say, one hundred volts we can momentarily get two hundred volts. The centrifugal governor or other suitable means may be used to cut out such extra turns. These extra turns are shown as connected to an auxiliary contact X', either directly or through a hand-switch S.

A suitable mechanical construction of centrifugal governor and a preferred construction of controlling-switch are illustrated more in detail in Figs. 1, 2, and 4. The governor-balls consist of the elbow-levers N, mounted in a bracket N', connected to the motor-shaft. The outward radial movement of the balls is resisted by a spring connecting them. The levers engage in a groove in a sleeve O, movable axially on the shaft and acting against a lever P, which is connected to a rod Q, carrying the switch-contact, composed in this case of a pair of springs R R attached to the rod and in electrical union with one another. This contact slides in the space between the series of contact-blocks t t, insulated from one another in a suitable box or holder, and a continuous plate or block t', mounted in a box at the opposite side of the track of the contact-springs R R. The sections of coil or circuits to be controlled are connected to the contacts t t and the opposite pole of the circuit to t', and the contact-springs R R of the switch thus formed will in obvious manner as it moves to and fro under the action of the governor cut the coil-sections into and out of circuit. A retractor-spring W acts on the switch-bar Q to help reverse its movement when the speed falls.

To obviate sparking as the switch-contact rides over the series of contacts, it should under ordinary conditions of use momentarily bridge successive contacts—that is, make contact with a succeeding before leaving a previous contact. This means a momentary short-circuiting of adjoining contacts, which introduces a serious difficulty when the set of coils connected to the series of contacts carries an alternating current. This difficulty arises from the fact that the section of coil short-circuited will bear the relation to others in circuit at the time of a secondary of a transformer and heavy currents will be generated in it, which, if long continued, will damage the switch-contacts and will give rise to a damaging arc at the instant of break of contact. To obviate this difficulty, I provide means for giving the switch a snap action as it passes from each contact of the series to another in both directions of adjustment. This snap action may be provided by a bar K, having a series of projections or teeth and intermediate spaces over which rides a spring-actuated catch or detent in the form, preferably, of a friction-roller h, carried by a spring attached to the switch-rod Q. At q in the rod Q or any other suitable point in the connections there is interposed a lost motion by means of a pin-and-slot connection, as indicated, to permit the switch to move freely under the operation of the spring-actuated catch or detent as the latter slips into each intermediate space between projections on bar K in obvious manner after having been forced over the summit of one of said projections. The parts are properly arranged so that this quick or snap action will cause the contact to snap from each contact-point to the next. As will be obvious, the form of bar K and detent h, as well as the form and manner of application of the spring which forces the detent into the depressions, and thereby causes the longitudinal movement of the switch-bar Q, may be largely varied. It is also obvious that either the bar K or the detent might be attached to the rod Q and the other be fixed in position on a suitable support.

What I claim as new, and desire to secure by Letters Patent of the United States, is—

1. The herein-described method of starting a single-phase alternating-current motor having a continuous or direct current armature-winding and commutator, which consists in impressing at starting an excess of electromotive force upon the terminals of the motor and subsequently reducing said electromotive force.

2. The herein-described method of starting and maintaining a single-phase alternating-current motor, having a continuous or direct current armature-winding and commutator, at a desired speed, which consists in impressing at starting an excess of electromotive force upon the terminals of the motor, subsequently reducing said electromotive force when the desired speed is reached and thereafter increasing the electromotive force whenever the speed of the motor falls below the desired speed and decreasing the electromotive force whenever the speed of the motor rises above the said desired speed.

In witness whereof I have hereunto set my hand this 28th day of October, 1903.

ALEXANDER CHURCHWARD.

Witnesses:
E. D. EVANS,
L. C. FOSS.